(12) United States Patent
Fantini

(10) Patent No.: US 8,576,973 B2
(45) Date of Patent: Nov. 5, 2013

(54) CONTAINER-LOADING CASK FOR AT LEAST ONE NUCLEAR FUEL ASSEMBLY, A GRIPPING DEVICE AND LOADING METHOD

(75) Inventor: Serge Fantini, Saint Genies de Comolas (FR)

(73) Assignee: Areva NC, Paris (FR)

( * ) Notice: Subject to any disclaimer, the term of this patent is extended or adjusted under 35 U.S.C. 154(b) by 1272 days.

(21) Appl. No.: 12/298,759

(22) PCT Filed: Apr. 26, 2007

(86) PCT No.: PCT/EP2007/054088
§ 371 (c)(1),
(2), (4) Date: Mar. 13, 2009

(87) PCT Pub. No.: WO2007/125072
PCT Pub. Date: Nov. 8, 2007

(65) Prior Publication Data
US 2009/0190711 A1    Jul. 30, 2009

(30) Foreign Application Priority Data

Apr. 27, 2006   (FR) ...................................... 06 51499

(51) Int. Cl.
*G21C 13/00*        (2006.01)
(52) U.S. Cl.
USPC ............................ 376/206; 376/460; 376/262
(58) Field of Classification Search
USPC .......................................... 376/203–206, 460
See application file for complete search history.

(56) References Cited

U.S. PATENT DOCUMENTS 5,319,686 A * 6/1994 Pizzano et al. ................ 376/272
5,695,003 A * 12/1997 Ashton et al. .................... 165/76

FOREIGN PATENT DOCUMENTS

| FR | 2574582 | 6/1986 |
| FR | 2582438 | 11/1986 |
| GB | 993372 | 5/1965 |

OTHER PUBLICATIONS

International Search Report for International Application No. PCT/EP2007/054088, mailed Jun. 22, 2007.

* cited by examiner

*Primary Examiner* — Timothy A Brainard
(74) *Attorney, Agent, or Firm* — Nixon Peabody LLP

(57) ABSTRACT

A cask for loading at least one nuclear fuel assembly in a transport container, including a body with a longitudinal axis (X) capable of sealably covering an upper end of a container, at least one aperture (10) for letting through a fuel assembly, at least one means for connecting to pneumatic confinement means and at least one means (56) capable of maintaining a means (58) for sealing a chamber of the container inside the cask and at a distance from an entrance of said chamber during loading, wherein the maintaining means (56) includes a first arm (60) rotationally mobile around a first axis and a second arm (62) attached to the first arm (60) and rotationally mobile relatively to the first arm, said cask also including external means for controlling the arms (68,86), and wherein the second arm (62) includes a housing (76) for receiving the sealing means.

22 Claims, 7 Drawing Sheets

US 8,576,973 B2

CONTAINER-LOADING CASK FOR AT LEAST ONE NUCLEAR FUEL ASSEMBLY, A GRIPPING DEVICE AND LOADING METHOD

CROSS REFERENCE TO RELATED APPLICATIONS OR PRIORITY CLAIM

This application is a national phase of International Application No. PCT/EP2007/054088, entitled "CONTAINER-LOADING CASK FOR AT LEAST ONE NUCLEAR FUEL BUNDLE, A GRIPPING DEVICE AND LOADING PROCEDUE", which was filed on Apr. 26, 2007, and which claims priority of French Patent Application No. 06 51499, filed Apr. 27, 2006.

DESCRIPTION

Technical Field and Prior Art

The present invention mainly relates to a container-loading cask with at least one nuclear fuel assembly notably of fuel rods containing MOX (mixture of uranium oxide and plutonium oxide) pellets, to a device for loading at least one nuclear fuel assembly into a transport container, to a gripping means cooperating with the cask and to a loading method applying said cask and said gripping means.

Nuclear fuel assemblies are formed by assembling tens of fuel rods with a small diameter relatively to their length; these fuel rods are claddings filled with nuclear fuel for example MOX pellets. These assemblies have a rectangular section with sides of several tens of centimeters, and measure several meters in length.

These assemblies are generally made in the factory manufacturing the pellets and have to be transported to the nuclear power stations where they will be placed in reactors.

The transport of these assemblies is carried out in secured containers, in which one or more fuel assemblies are sealably confined.

During their unloading in the nuclear power plants, the containers may either be immersed or not in a pool. When the assemblies exit the containers, water enters the container. At the end of the unloading, the container is taken out from the pool. The external portions of the container are cleaned so as not to include radioactive contamination traces beyond an authorized threshold. Next, the container is sent back, closed, to the assembly-manufacturing factory for a next transport.

Now, the inside of the container may contain traces of contamination. Thus, during the next filling and opening of the container, if no step is taken for protecting the outside environment from the inside of the container, the latter will be subject to contamination.

The plugs of the container used for sealably plugging the cells for receiving assemblies, may also include radioactive particles on their lower face in contact with the inside of the cell.

Therefore, an object of the present invention is to provide a device for loading a container with radioactive fuel assemblies, providing protection of the external environment against the inside of the container.

An object of the present invention is also to provide a method for loading a container with radioactive fuel assemblies providing improved confinement.

DISCUSSION OF THE INVENTION

The objects stated earlier are achieved by a loading cask capable of being sealably positioned on the upper portion of the container on which are mounted the plugs sealing the storage cells, said cask including an aperture for letting through a means for removing a plug from a cell and a housing inside the cask in order to store the plug during loading.

In other words, all the components in contact with the inside of a cell are confined in the cask, thereby avoiding any risk of polluting the external environment.

The subject-matter of the present invention is therefore a cask for loading at least one fuel assembly in a transport container, including a body with a longitudinal axis capable of sealably covering an upper end of a container, at least one aperture for letting through a fuel assembly, and at least one means capable of maintaining a means for sealing a chamber of the container inside the cask and at a distance from an inlet of said chamber during loading.

The cask may include a means for letting through a pneumatic tool intended to be connected to the container and a housing for receiving a plug when the tool is connected, said plug being intended to sealing the connecting orifice of the pneumatic tool.

With the pneumatic tool, it is possible to actuate shoes for maintaining the assemblies in the cells.

In a particular embodiment, the maintaining means includes a first arm rotationally mobile around a first axis and a second arm attached to the first arm and rotationally mobile relatively to the first arm, said cask also including external means for controlling the arms, and wherein the second arm includes a housing for receiving the sealing means.

Advantageously, the cask includes control means for the first arm and control means for the second arm, the second arm being able to be displaced independently of the first arm.

Further, the control means may be manually actuated and include assistance means for displacing the arms according to predetermined trajectories.

In particular, the control means may be formed by first and second handwheels firmly attached to first and second connecting shafts respectively, said first and second connecting shafts being mechanically connected to the first and second arms respectively, a mechanical connection between the second handwheel and the second arm being positionable inside the first arm.

For example, the assistance means include a fixed flange and a rotationally mobile flange with a connecting shaft, the flanges being superimposed, a flange including an imprint delimiting two extreme positions of the associated arm and an abutment borne by the other flange, so as to limit the angle of rotation between both flanges, the abutment may be formed by a movable peg placed in an orifice in the other flange facing the imprint. The flanges are for example disks.

Advantageously, the mobile flange associated with the second arm is formed by the handwheel.

In an exemplary embodiment, the mobile flange is distinct from the control handwheel of the first arm and jointly rotatable with the latter, and the fixed flange for the second arm is attached on the upper surface of the cask.

The assistance means in an advantageous embodiment include several imprints in order to define several extreme positions.

The imprints for example are circular arcs centered on the centre of the flanges.

Further, the control means may include means for indexing the position of each arm.

In particular, the locking means may include a peg capable of cooperating with notches made on the periphery of the mobile disk, each notch being aligned with an end of an imprint along a radius of the disk.

Advantageously, the peg is elastically brought back into contact with the disk by means of a spring.

Preferably, the housing is placed at a free end of the arm and includes a sealed bottom so as to collect dusts and/or debris borne by the plug.

Further, the arm may also include the housing for the plug of the orifice for connecting the pneumatic tool.

In a particular embodiment, the cask includes several apertures each intended to face a respective chamber of the container.

The cask may include means for angularly indexing the cask relatively to the container so that an aperture of the cask is facing a chamber of the container. The indexing means may include a rib capable of cooperating with a groove.

The rib for example protrudes from the inner surface of the cask and the groove is made in the outer surface of the container.

Additionally, the cask may also include visual marks in order to assist with placing the cask on the container.

The cask may also include at its lower end, intended to come into contact with the upper end of the container, first and second annular bearing faces, intended to be respectively supported by first and second support faces of the container, the second bearing face being positioned radially towards the inside of the cask relatively to the first bearing face, both bearing faces being connected through a sleeve extending along the longitudinal axis.

In particular, the second bearing face includes an annular gasket capable of coming into contact with an upper face of the container. The gasket is an O-ring gasket for example.

The cask may also include rings for allowing gripping and displacement of the cask.

The cask also includes a plug for the entrance of the passage, advantageously.

The passage for the pneumatic tool for tightening the assemblies is also provided with an aperture sealed by a plug.

Advantageously, the plugs are in Kyowaglass® providing radiological protection and allowing the inside of the cask to be visible during operations.

Kyowaglass® is a transparent methacrylic resin made by Kuraray and used in the nuclear and medical fields as a shield against radiations.

For example, the cask may also include access hatches for accessing the inside of the cask.

The body of the cask for example includes a wall with a polygonal shape, formed with Kyowaglass® panels, providing radiological protection and visibility of the inside of the cask, and an upper bottom of polygonal shape. The upper bottom is also in a protective material, for example in borated polyethylene plaster (BPP).

The panels may be connected to each other through a component including two faces tilted relatively to each other by the desired angle between two panels and a face orthogonal to both first faces forming a support for the upper bottom of the body, the component also including a stay rod for stiffening it, a gasket being positioned between the panels and the connecting components.

The cask advantageously includes as many passages as there are cells of the container for loading assemblies, for example eight of them.

The first arm may also include an access hatch for accessing the mechanical connection.

The cask in a particular embodiment includes a borolene crown.

An subject-matter of the present invention is also a device for loading at least one nuclear fuel assembly in a transport container including a cask as described earlier and dynamic confinement means intended to be connected with a channel communicating with the inside of the chambers and capable of causing an air flow from the outside to the inside of the cask, and then to the inside of the chambers during the whole opening period of a chamber.

The dynamic confinement means may include a pneumatic suction means intended to be connected to a means for collecting particles sucked up into the container.

The subject-matter of the present invention is also a means for gripping a plug of a container chamber in order to place it in the cask maintaining means according to the present invention, including radially mobile fingers.

Advantageously, the fingers sealably emerge from a casing including a mechanism for controlling said fingers.

Further, the gripping means may include a device for detecting an abnormal force on the fingers, for example a spring with determined stiffness.

Additionally, the gripping means advantageously includes at an end opposite to the one provided with gripping fingers, a ring for hooking up to a post.

The subject-matter of the present invention is also a method for loading a container with a nuclear fuel assembly, including the following steps:

a) placing the cask described earlier on the upper end of a container, b) connecting dynamic confinement means to the container, c) removing the plug for the pneumatic tool and placing the pneumatic tool, d) removing the plug from the first cell, e) placing an assembly in the first cell, f) replacing the plug of the first cell, g) repeating steps d) to f) if necessary, for loading other assemblies in the other cells, h) removing the pneumatic tool and replacing the plug for the pneumatic tool, i) disconnecting the dynamic confinement means, j) removing the cask.

Removal of the pneumatic plug of the container and connecting-up of the pneumatic tool instead of the pneumatic plug, are performed during step c).

Further, the handling of the pneumatic plug of the container and of the cell plugs is carried out with a gripping means according to the present invention.

Advantageously, before removing the plug from the first cell, dynamic confinement means are actuated.

In a particular embodiment, prior to removing the pneumatic plug of the container or the plugs of the cells, removal of a plug from an associated passage of the cask is carried out.

Advantageously, following step d), provision may be made for placing a throat on the contour of the aperture of the chamber.

SHORT DESCRIPTION OF THE DRAWINGS

The present invention will be better understood with the help of the description which follows and of the appended drawings, wherein the upper portion and the lower portion correspond to the high and low portions of the drawings, respectively, and for which:

DETAILED DISCUSSION OF PARTICULAR EMBODIMENTS

Figure 1:
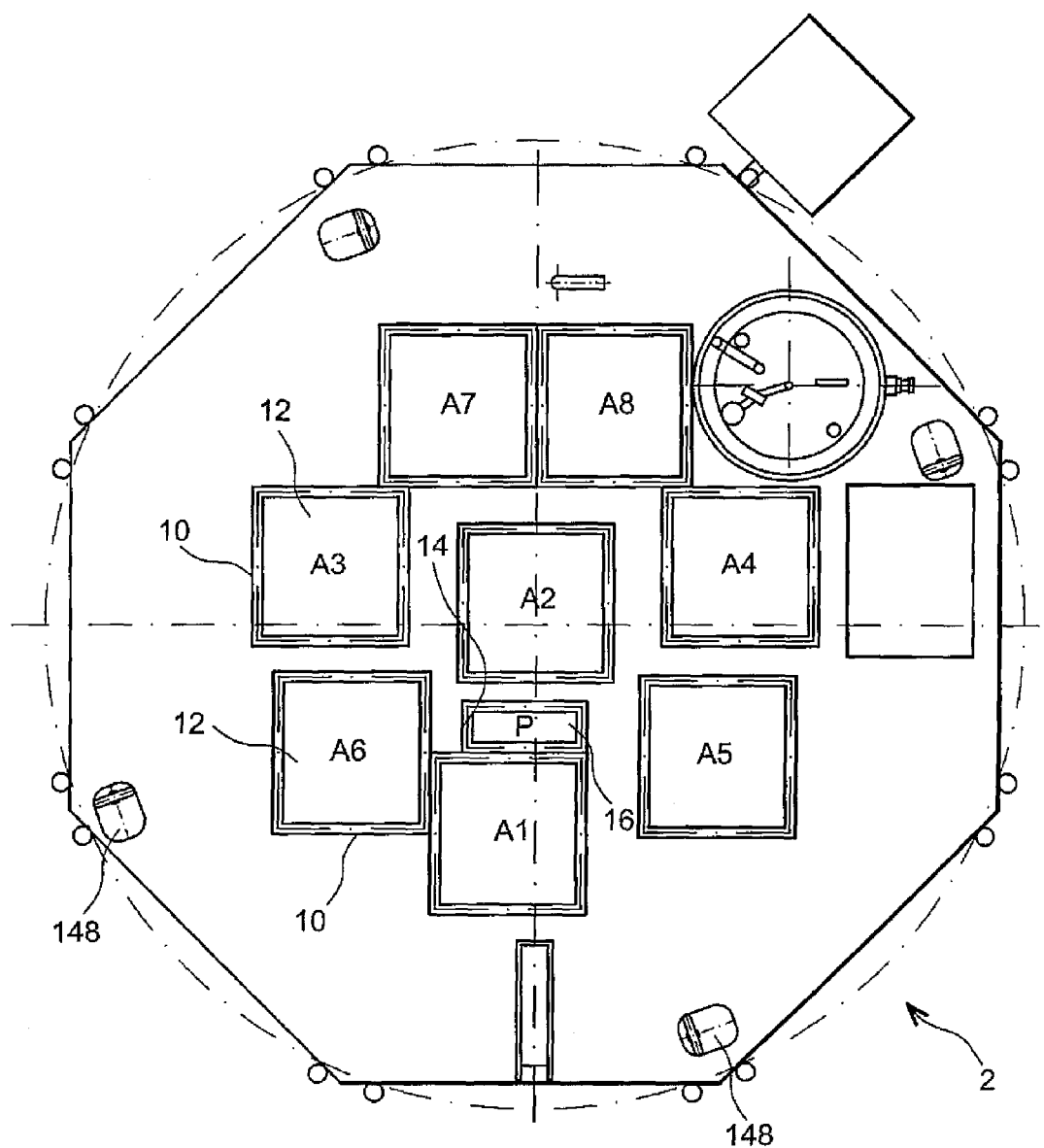
FIG. 1 is a top view of a cask according to the present invention.
Figure 2:
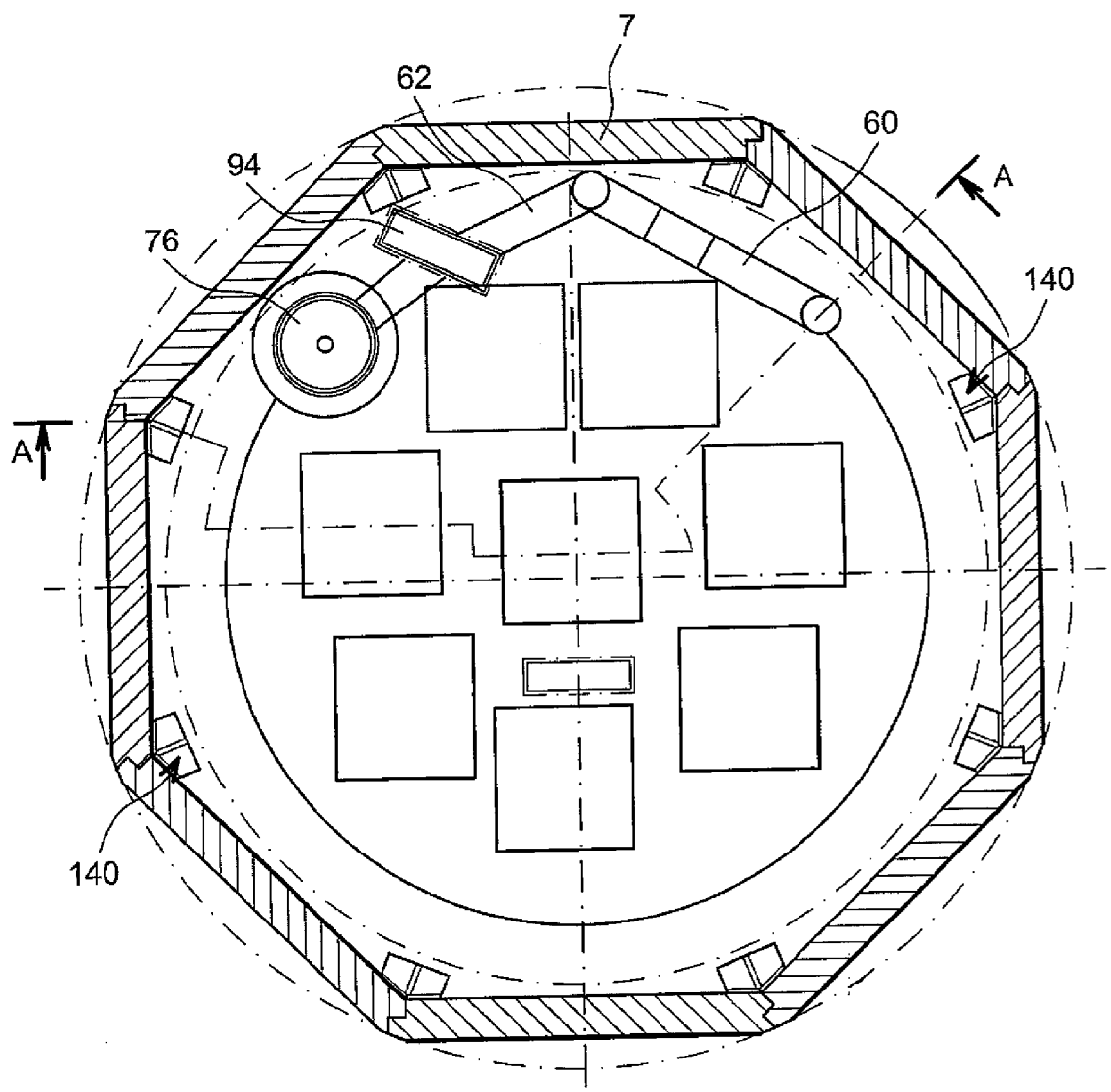
FIG. 2 is a transverse sectional view of FIG. 1.
Figure 3:
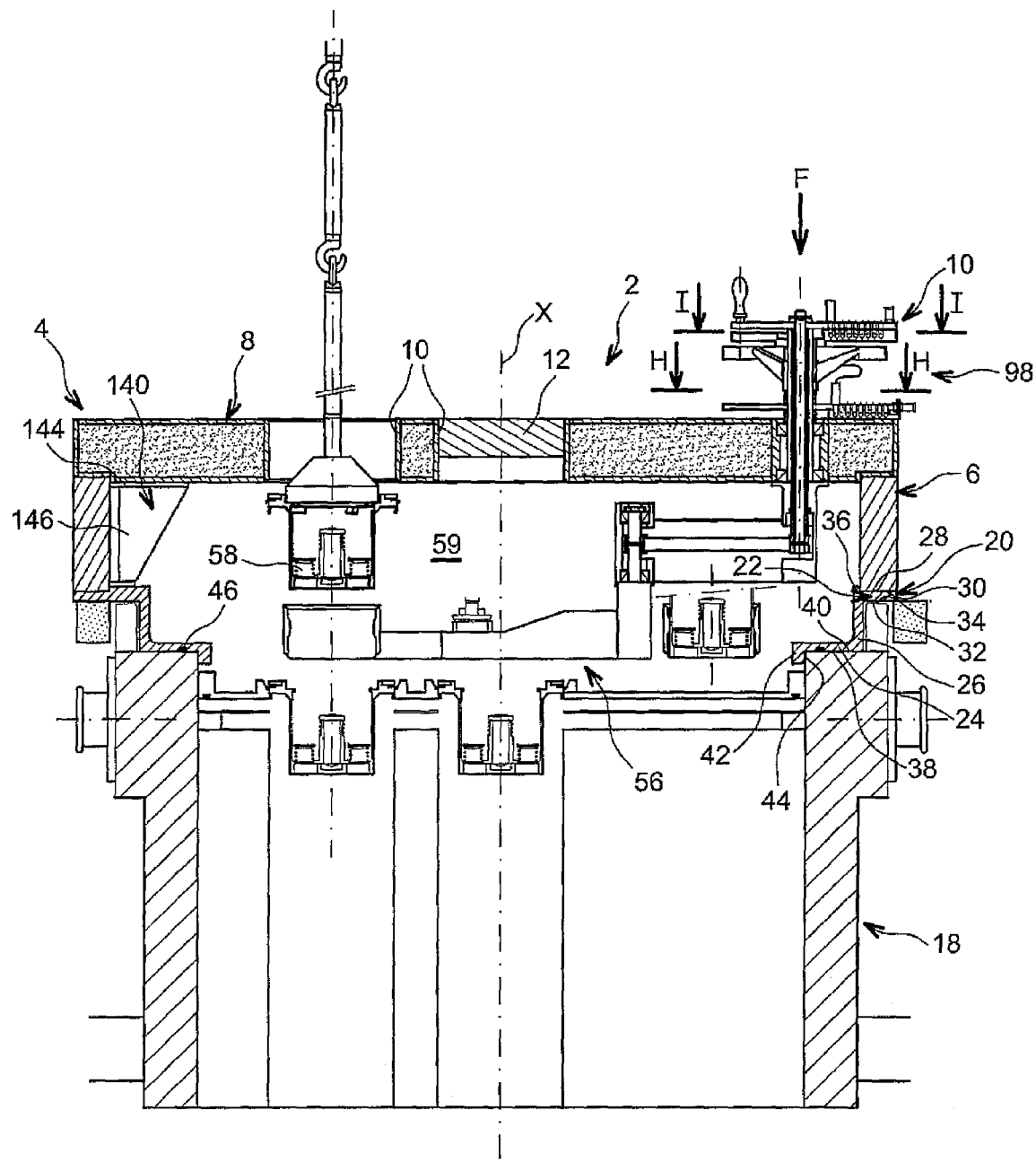
FIG. 3 is a view along a sectional plane A-A of FIG. 2 in a loading step.

In FIGS. 1-3, a cask 2 according to the present invention may be seen, including a body 4 with a longitudinal axis X, provided with a wall 6 and an upper bottom 8. In the illustrated example, the cask 2 has a substantially octagonal shape, the wall 6 is therefore with an octagonal section and the upper bottom 8 is also octagonal. The bottom 8 includes apertures 10 for letting through fuel assemblies (not shown) and sealed by removable plugs 12. The apertures are for example of a rectangular, advantageously square shape.

In the illustrated example, the cask includes eight apertures and allows eight container cells A1-A8 (not shown in FIG. 1) to be filled. The references A1-A8 are placed in FIG. 1, in order to associate a particular cell with each passage 10.

The bottom 8 also includes an aperture 14 also provided with a removable plug 16 in order to allow connection to a means for controlling pneumatic tightening of the shoes (not shown), also called a pneumatic tool. With this tightening control, the assemblies may be maintained in the housings after their loading in the container.

The roof is advantageously made in borated polyethylene plaster (BPP) and the wall 6 is made with panels 7 in Kyowaglass® for example. The plugs 12 and 16 are also advantageously made in Kyowaglass®. Kyowaglass® is a neutrophage material, which like BPP provides biological protection.

Kyowaglass® is a transparent methacrylic resin manufactured by Kuraray and used in the nuclear and medical fields as a shield against radiations.

The body 4 also includes, at a lower end of the wall 6, means 20 for positioning the cask 2 on a container 18. These means 20 are stepped and include first 22 and second 24 rings connected through a cylinder 26 of axis X. The first ring 22 extends radially towards the outside of the cylinder 26 and the second ring 24 extends radially towards the inside of the cylinder 26. The first 22 and second 24 rings are orthogonal to the cylinders.

Rings which are tilted relatively to the X axis, do not depart from the scope of the present invention.

The cylinder may also be replaced with a cone, the section of which increases when moving away from the cask.

The first ring 22 includes an upper face 28 fixedly bearing against a lower end 30 of the wall 6, and a lower face 32 intended to come into contact with a first upper end annular face 34 of the container 18.

Advantageously, the upper face 28 includes, at a radially internal end, a protruding crown 36 with suitable dimensions so as to cooperate with the inner periphery of the lower end 30 of the wall 6, ensuring that the first ring 22 is transversely maintained relatively to the wall 6.

The second ring 24 includes a lower face 38 intended to bear against a second upper end annular face 40 of the container 18 placed below the first annular face 34.

Advantageously, a crown 42 extends from one radially internal end 44 of the second ring 24 away from the cask and is dimensioned in order to cooperate with an inner periphery of the container.

In the illustrated example, the positioning means 20 are made in one piece in stainless steel.

The crown provides complementary radiological protection.

A sealing means 46 is also provided on the lower face 38 of the second ring 24 and is intended to come into sealed contact with the annular face 40. The gasket in the illustrated example is formed by an O-ring gasket mounted on an annular groove made in the lower face 38.

Figure 4:
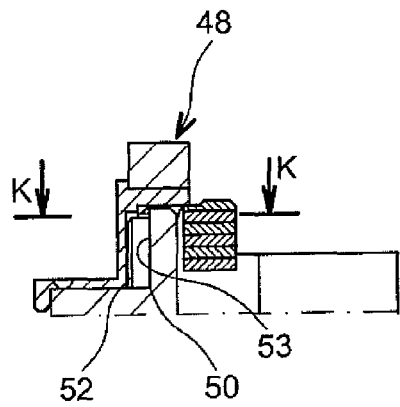
FIG. 4 is a detailed view of FIG. 3.
Figure 5:
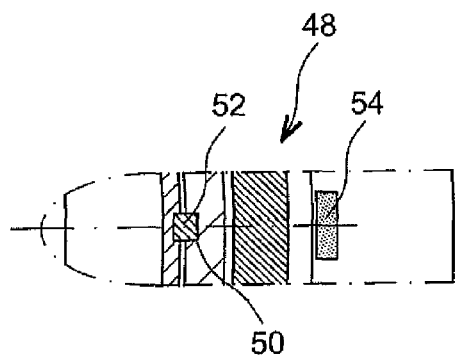
FIG. 5 is a sectional view along the sectional plane K-K of FIG. 4.

The cask also includes (FIGS. 4 and 5) means 48 for angularly indexing the cask relatively to the container so as to align along a vertical axis an aperture 10 with an entrance 14 of a cell.

The means 48 are in the illustrated example formed by a groove 50 cooperating with a rib 52. The rib 52 may be borne by the container and the groove 50 by the cask or vice versa.

The rib is for example formed by a bar with a square section, fixed in a groove made in a cylindrical wall 53 connecting the first 34 and second 40 end faces of the container. The groove 50 is made in the cylinder 26.

The cask and the container 18 also advantageously include visual marks 54 at right angles to the groove 50 and to the rib 52 and visible from the outside by an operator in order to assist the latter in aligning the groove 50 and the rib 52, facilitating the placing of the cask on the container.

The cask also includes means 56 (FIG. 3A) for maintaining plugs 58 of the cells A1-A8 inside the cask in a confined space 59 between the upper bottom 8 and the container, when the latter are removed from the entrance of the cells in order to allow assemblies to be placed.

In the illustrated example, the means 56 include a first arm 60 rotationally mobile relatively to the upper bottom 8 around an axis X1 parallel to the X axis and a second arm 62 rotationally mobile relatively to the first arm 60 around an axis X2 parallel to the X1 axis and distinct from the latter.

The first arm is jointly rotatable with a shaft 64 mounted so as to be freely rotatable in a passage 66, made in the upper bottom 8, by means of bearings 67. The shaft 64 is rotationally displaceable from the outside of the cask by means of a handwheel 68.

The second arm 62 is advantageously attached so as to be freely rotatable, by a first end 70 to an end 72 of the first arm away from the shaft 64. The second arm 62 includes at a second end 74, a housing 76 for receiving a plug 58.

The second arm 62 includes at its first end 70, a shaft 80 mounted in a bore 82 made towards the end 72 of the first arm 60 and capable of pivoting around the X2 axis by rotation via bearings 84.

The second arm 62 is positioned underneath the first arm 60 on the side of the open end of the cask.

The second arm 62 may be positioned above the first arm 60 and close to the upper bottom 8.

The displacement of the second arm 62 is also controlled via a handwheel 86 positioned outside the cask 2, and independent of the handwheel 68 controlling the displacement of the first arm 60. The second arm 62 is connected to the handwheel 86 through connecting means 88 which are advantageously positioned inside the first arm 60 and the shaft 64.

The connecting means 88 include a shaft 90 with an axis X1 coaxial with the shaft 64 and mounted inside the latter, the shaft 64 therefore is made as a tube in this embodiment. The means 88 also include a transmission component 92 connecting the shaft 90 and the shaft 84 so as to transmit the displacements of the handwheel 86 to the arm 62.

Figure 3A:
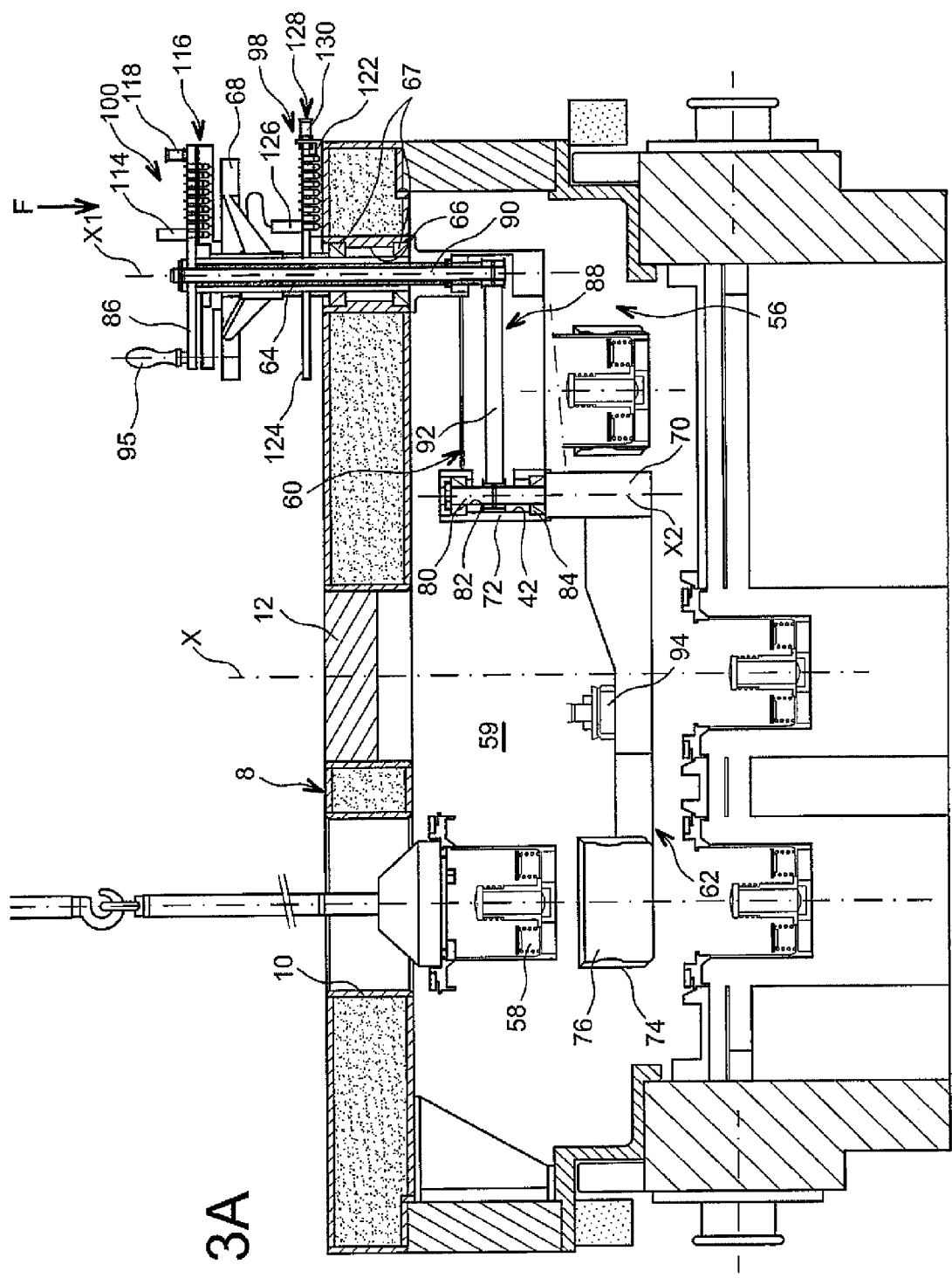
FIG. 3A is a view at a larger scale of FIG. 3.

The handwheel 86 may for example include, as this is illustrated in FIG. 3A, a displacement handle 95 protruding from the handwheel.

The displacement of the first arm 60 is limited by abutments (not shown) in order to avoid any impact between the arm 60 and the panels forming the wall 6 of the cask. Advantageously, the second arm 62 is positioned sufficiently low along the X axis, so as not to risk coming into contact with the panels forming the wall 6. Indeed, it is found at the connecting component 20.

However, provision may also be made for abutment means for the second arm 62.

A first and a second arm, both located at the panels forming the wall 6, do not depart from the scope of the present invention.

The second arm 62 also includes a second receiving housing 94 for receiving the plug of the pneumatic connector of the container 18. The latter is advantageously positioned substantially in the middle portion of the second arm 62 between the housing 76 for receiving the cell plug and the end 70 connected to the first arm 60. The housing 94 advantageously is of a rectangular shape substantially identical to that of the plug 16.

The housings 76 and 94 advantageously include closed and sealed lower bottoms in order to ensure collection of the possible dusts and debris which may have been deposited on the lower surface of the plugs, this surface being in contact, when the plugs are in place, with the interior volume of the cells and of the pneumatic connector respectively.

The plugs 58 as illustrated in FIGS. 3 and 3A are lifted by a gripping device which will be described subsequently, and moved away from the entrance of the cells. The second arm 62 is then placed underneath the plug 58 so that the housing 76 is positioned exactly facing the bottom of the plug 58 in order to be able to receive the latter. The arm 62 is then displaced in order to free the trajectory between the passage 10 of the upper bottom of the cask 8 and the entrance of the associated cell and to let through a fuel assembly.

Advantageously, substantially transparent areas are provided in the cask so that the movements of the arms in the cask are visible to the operator.

Advantageously, means for assisting the displacement of the first 60 and the second arm 62 are also provided in order to allow rapid placing of the arms 60 and 62 for receiving the plug 58.

The first arm 60 and the second arm 62 include displacement-assisting means 98 and 100, respectively. As the assisting means 98 and 100 are of substantially equivalent structure and operation, we shall describe in detail the assisting means 100 of the second arm 62.

Figure 7:
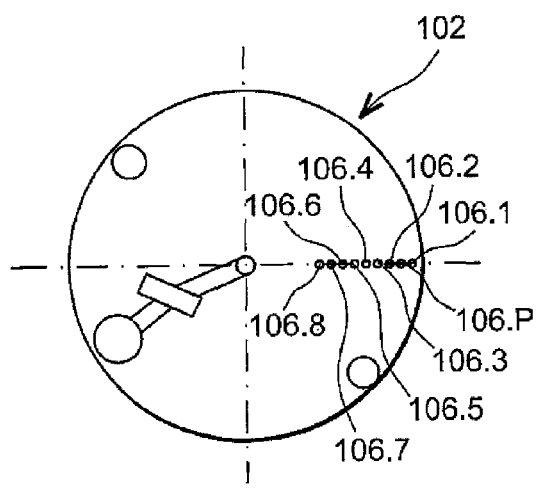
FIG. 7 is a top view along the arrow F of a detail of FIG. 3.
Figure 8:
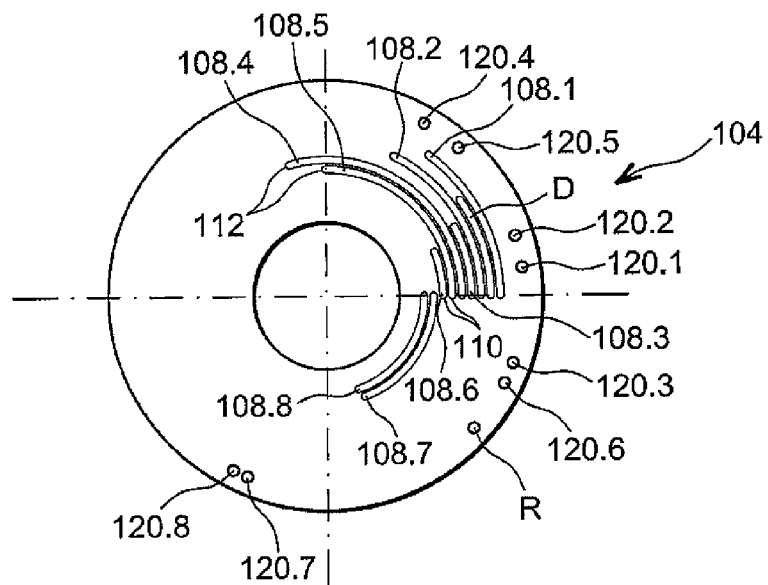
FIG. 8 is a sectional view along the sectional plane I-I of FIG. 3.
Figure 9:
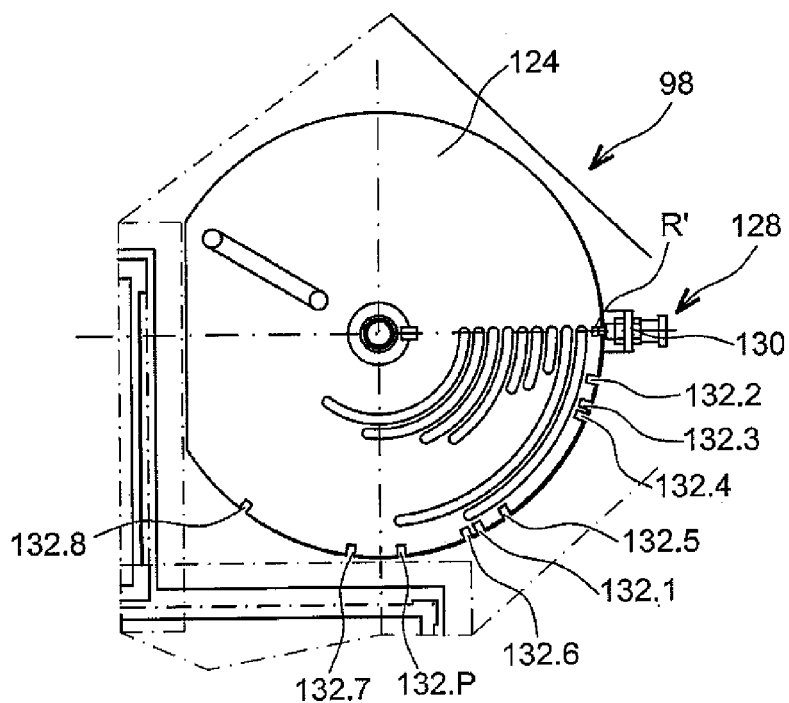
FIG. 9 is a sectional view along the sectional plane H-H of FIG. 3.

The assisting means 100 include a first flange 102 and a second flange 104, the first flange 102 being positioned above the flange 104 in the direction of the arrow F, the flanges 102 and 104 being illustrated in FIGS. 7 and 8 respectively.

Advantageously, the first flange 102 is formed by the handwheel 86, but a flange distinct from the handwheel 86 and jointly rotatable with the latter may be provided. The flange 102 has the shape of a disk including, along a radius, a succession of orifices 106.1 to 106.8 and 106.P, the number of which is equal to the total number of plugs to be displaced, the plugs being plugs for closing the cells which are to receive a fuel assembly and the pneumatic connection plug. In the example illustrated, there are therefore nine orifices (eight for the cells and one for the pneumatic connector) made in the flange 102.

The flange 104 is fixed and the flange 102 is mobile relatively to the flange 104.

The flange 104 is also disk-shaped and includes grooves 108 in the form of a circular arc centered on the centre of the disk forming the flange 104. The grooves 108 include a first end 110 and a second end 112, all the ends 110 being aligned along a radius and the ends 112 being each positioned along a distinct radius.

Each groove 108 corresponds to a distinct trajectory 108.1, 108.2, 108.3, 108.4, 108.5, 108.6, 108.7, 108.8 and D of the arm 62 in order to properly position it in order to fetch each of the nine plugs.

The orifices 106 of the first flange 102 and the grooves 108 and D of the second flange 104 are positioned on the flanges 102 and 104 respectively, so that when the flange 102 is positioned above the flange 104, the latter are aligned along a direction parallel to the X1 axis.

The device 100 also includes a connecting component between an orifice 106 and a groove 108 formed in the example, illustrated by a removable peg 114, including an end with a diameter equal to the diameter of the orifices 106. It should be specified that the width of the grooves 108, i.e. their dimension along a radius of the disk forming the flange 104, is sufficient for receiving the end of the peg 114.

The corresponding cell is indicated facing each of the orifices 106.1 to 106.8 and the orifice 106.P.

We shall now explain the operation of this assisting means 100.

When the operator wants to displace the second arm 62, so as to put it in a position for receiving the plug of the cell A1, he/she will place the peg 114 in the orifice 106.1, the interior end of the peg 114 will then penetrate into the circular arc groove 108.1.

The operator will cause the handwheel 86 to rotate from the extreme position 110 to the second extreme position 112 delimited by the groove 108.1. Thus the second arm will be displaced between a first position, a so-called <<rest>> position, and a second position in which the housing 76 will be placed just underneath the plug 58 held by the gripping system. Thus the operator does not himself/herself have to direct the arm 62, which would be relatively tedious and long-lasting, but the displacement is entirely guided by the groove 106.1.

Also, by placing the peg 114 in another orifice 102.2 to 106.8 or the orifice 106.P, the trajectory of the arm will in the same way be guided for fetching the plugs of cells A2-A8 or the pneumatic plug, respectively.

The arm 62 may also be indexed in position, in the so-called <<waiting position during the filling>>. During the filling of one of the cells, the arm contains the plug of the corresponding cell in its housing 76 and is set in a so-called <<parking>> position while waiting for the filling of the cell to be carried out, this parking position should be such that it does not interfere with the placing of the fuel assembly.

In order to be sure that the arm 62 does not move during the filling and will not be interposed on the filling trajectory, a means is provided for indexing the position of the arm 62 in this parking position. This indexation means 116 is capable of immobilizing the first flange 102 relatively to the second flange 104, i.e. immobilize the rotating handwheel 86. The indexation means 116 is formed for example by a peg 118 mounted on the handwheel 86 and capable of being displaced axially, parallel to the X1 axis and capable of penetrating into orifices 120.1 to 120.8, and 120.P, so as to immobilize the arm in one of the parking positions corresponding to the filling of the cells A1-A8 or to connecting the pneumatic tool, and in a rest position R of the arm when the latter is not used and does not contain any plug.

The parking position and the rest position may coincide.

The orifices 120.1 to 120.8, 120.P and R are borne by the second flange 104 facing the orifice in which the peg 118 is slidably mounted. Advantageously, the peg 118 is elastically returned towards the second flange 104 so that it automatically penetrates into the orifices 120.1 to 120.8, or 120.P or R.

Advantageously, the peg 114 is tied to the handwheel 86, for example by a cord, so that it is not lost.

It may also be provided that the peg 118 of the position indexation means 116 is a peg which is identical to the peg 114 or of a shape close to that of the latter; provision may also be made for the use of the same peg for guiding the trajectory of the arm 62 on the one hand and for immobilizing the arm 62 on the other hand.

As regards the guiding means 98 for the first arm 60, as described earlier, the latter are close in structure and operation to the means 100 for controlling the second arm 62. However these means 98 are distinguished from the means 100 in that the orifices are borne by the lower flange and the grooves are borne by an upper flange 124. The lower flange 122 is attached onto an upper face of the upper bottom 8 and the flange 124 is distinct from the control handwheel 68 of the first arm 60, but jointly rotatable with the latter. For example, the flange 124 is attached onto the arm 64 underneath the handwheel 68. Thus, guiding the flange 124 will also guide and limit the angular displacement of the handwheel 68 between two positions for each cell.

Like for the guiding means 100 for the second arm 62, the flange 124 includes nine grooves, eight for each cell and one for the pneumatic connector, and the flange 122 as for it includes nine orifices in an equivalent way to the first flange 102.

The device 98 also includes a peg 126 which is of a structure identical to that of the peg 114 used by the device 100.

The device 98 also includes means 128 for indexing the position of the first arm 60, these means 128 being distinguished from the means 116 in that they include a peg 130 capable of sliding substantially perpendicularly to the X1 axis.

An end of said peg 130, is able to cooperate with the notches 132.1 to 132.8, 132.P and R' made on a slice of the disk 122, so as to define a parking position for each of the positions that the arm should adopt when filling a cell, when at rest, or when connecting the pneumatic connector.

As described earlier, the device 98 also includes indications on the flange 124 so as to locate the corresponding grooves at each of the filling steps or the steps for connecting the pneumatic connector.

Both handwheels are intended to be displaced in rotation one after the other.

Provision may also be made for the use of identical means 98 and 100.

In the described embodiment, the first and the second handwheel are capable of rotating around an identical X1 axis, but having two distinct axes of rotation may be contemplated.

Advantageously, the handwheels are manually displaced by an operator. But providing actuation means, for example of the electric motor type, for displacing the first and the second handwheel does not depart from the scope of the present invention.

The peg 126 of the means 98 may also, as illustrated, be tied up to the handwheel or to the shaft 64 by a cord in order to avoid losing it.

A means for maintaining the plugs during the loading of the container including a single arm or two arms moving together by means of a single control, or more than two arms, does not depart from the scope of the present invention.

Figure 10:
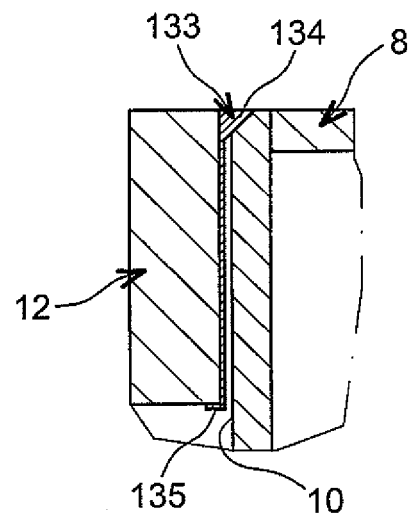
FIG. 10 is a detailed view of FIG. 3.

We shall now describe in connection with FIG. 10, the apertures 10 intended to receive the plugs 12 of the cask.

The apertures 10 are of a rectangular shape and receive a plug 12, for example made in Kyowaglass®, also of a rectangular shape. These plugs 12 are maintained in the aperture 10 via a ring 133, the outer diameter of the ring 133 being less than the inner diameter of the passage 10.

The ring 133 includes a base 134 intended to cooperate with the upper end of the passage 10. Advantageously, the base 134 includes a frustro-conical external wall which will be applied on a chamfer formed at the upper end of the passage 10. The ring 133 also includes at its lower end, a surface 135 extending radially towards the inside of the ring and forming an annular support for the lower end of a plug 12.

It must be understood that the contact between the upper bottom 8 and ring 133 is sealed, and that the contact between the ring 133 and the plug 12 may also be sealed.

For example, the ring 133 is made in stainless steel.

The aperture 14 also includes a ring similar to the ring 133.

Figure 6:
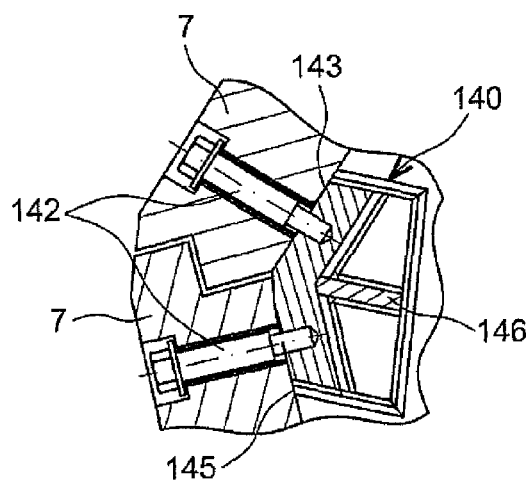
FIG. 6 is a detailed view of FIG. 2.

In FIG. 6, a construction detail of the wall 6 of the body 4 of the cask, in particular the connection between both panels 7 forming the octagonal wall, illustrated in the example, may also be seen.

Each panel 7 includes at one end, a cut-out, for example a saw-toothed cut-out in the illustrated example, in order to penetrate into the matching saw-toothed cut-out of an end of another panel so as to allow proper positioning of each panel relatively to each other. The panels 7 are connected to each other at said ends through a support 140, to which an end of a first panel and an end of a second panel are attached, for example by a system 142 of screws.

A gasket (not shown) is advantageously provided between two panels.

The support 140 includes a first 143 and a second 145 face forming a determined angle for properly positioning one panel relatively to the other. The support 140 also includes a substantially planar supporting component, perpendicular to both previous tilted faces 143, 145 and coming into contact with the upper bottom 8 thereby forming a stiffening system. The support 140 also includes a stay rod 146, improving the stiffness of the whole of the cask.

In the illustrated example, in which the cask has an octagonal shape, the body 4 includes eight supports 140.

Advantageously, the cask also includes rings 148 on the upper face of the upper bottom 8 allowing displacement of the cask 2 by hooking it up via these rings to slings not shown.

The cask may also include, on its side walls for example, hooking-up systems for a ladder so as to allow the operator to access the handwheel 68 and 86 and/or handrails in the case of intervention of an operator on the cask.

We shall now describe the means for gripping the plugs 12 and 16 from the passages 10 and 14 of the cask and the plugs 58 of the container 18.

The means for gripping the plugs 12 and 16 are for example formed with a suction cup, since the plugs 12 and 16 are formed in Kyowaglass® in the presented example.

This suction cup may be handled manually and put into contact with a plug, in order to withdraw it.

The means for gripping the plugs 58 of the containers are hooked up to a sling and brought to the level of the plugs, for example via a bridge. The gripping means are formed, for example, by radially mobile fingers, which will cooperate with an annular groove made in the upper surface of the plug

58. These fingers are sealably mobile relatively to an actuation body. The fingers pivot around a vertical axis so as to be able to approach and move away from the centre of the actuation body and to penetrate into the annular groove.

The gripping means advantageously include a system (not shown) for detecting an abnormal force exerted on the actuation body and on the fingers. This system includes for example a spring with a determined stiffness, an indicator attached to a free end of the spring, to which is attached the actuation body provided with the fingers and visual marks positioned on a casing fixed relatively to the spring.

When no load is applied to the spring, the indicator is facing a first visual mark.

When the load increases and exceeds the stiffness of the spring, the indicator moves.

When the load exerted on the fingers become abnormally large, the indicator is positioned in an area marked as critical. The operator then knows that there is a problem for the displacement of the relevant plug 58.

Storage systems for the different components used for filling the containers are also provided, this time in the workshop in which the filling has to be carried out or in a room adjacent to the workshop.

In particular for the cask 2, the latter may be placed on a rack containing a lower lid in which the cask is sealably deposited, so that any contamination which may have exited the container and been placed in the space 59, is confined in the cask closed by the lower lid.

Hooks may also be provided on the surface of the Kyowaglass® plugs 12 and 16, thereby avoiding use of suction cups, however this reduces visibility through the plugs.

The cask also includes, on the upper face of the upper bottom, a means for maintaining a pneumatic pipe intended to be connected to the pneumatic connector of the container.

As explained earlier, the container may notably be contaminated because of the unloading of the assemblies in a pool, and therefore include waste which may escape from the container during its loading. Further, the operators directly intervene on the cask, e.g. for removing the Kyowaglass® plugs, so it is not possible to provide an isolation room for the cask and the container upon its loading.

Dynamic confinement means are then provided, intended to prevent contaminating particles from exiting the container during its loading.

Figure 11:
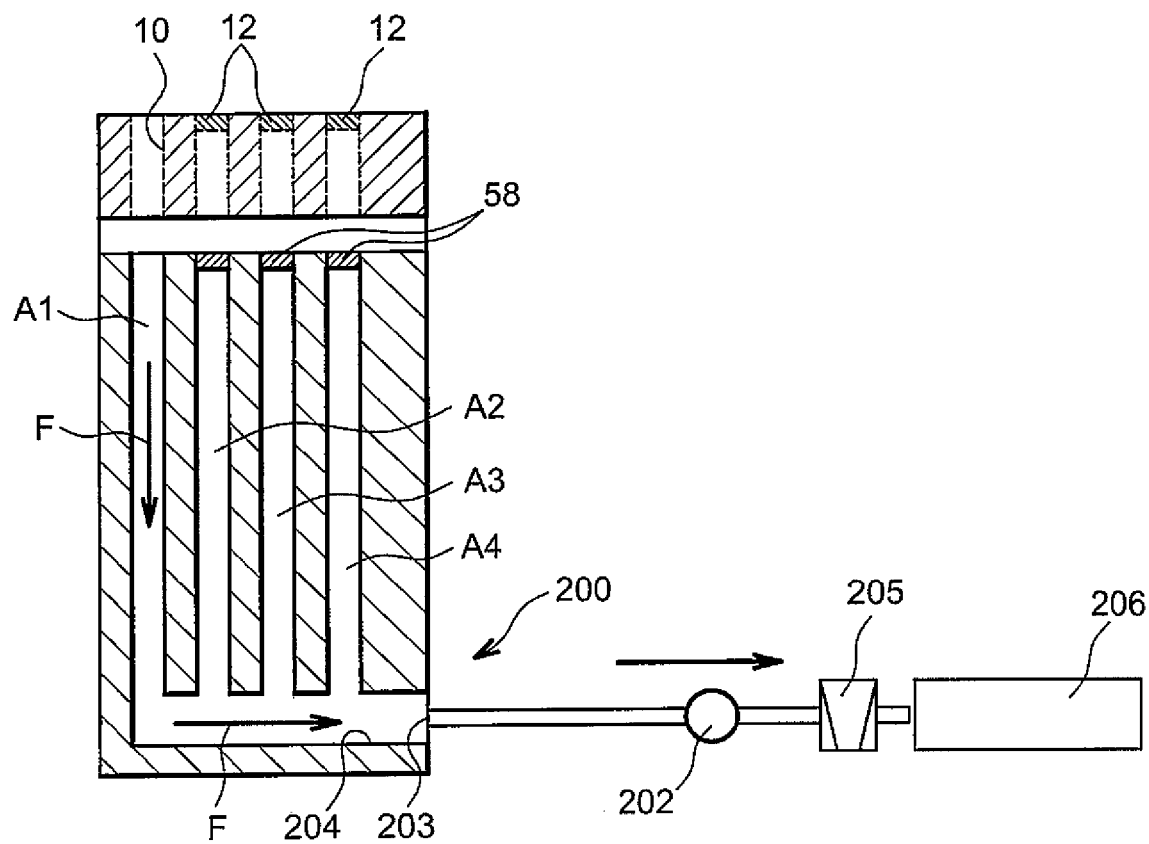
FIG. 11 is a schematic illustration of a loading device according to the present invention.

A diagram of the loading device including such confinement means is illustrated in FIG. 11.

The dynamic confinement means 200 include a suction means 202 of the fan type, connected to the bottom of the container through an orifice 203 made in the bottom of the container. In the illustrated example, the container includes a lower channel 204 into which all the chambers A1, A2, A3, A4, A5, A6, A7, A8 open out. This channel opens outwards through the orifice 203.

The confinement means 200 are connected to a ventilation network 206. A filter 205 may be provided downstream from the fan upstream from the ventilation network 206.

Thus, when the fan 202 is actuated, a depression occurs in all the chambers. Thus, when a plug is removed from a cell, a flow of air occurs along the arrows F, the air flows from the outside towards the inside of the cask, and then towards the bottom of the container, preventing contaminating particles from exiting through the apertures 10 of the cask.

We shall now explain the method for filling a container 18 by means of a cask according to the present invention.

An exemplary method according to the present invention includes the following steps:

a) placing the cask on the container, b) connecting dynamic confinement means 200 to the container, c) removing the plug for the pneumatic tool and placing the pneumatic tool, d) removing the plug from the first cell, e) placing an assembly in the cell, f) replacing the plug of the first cell, g) repeating steps d) to f), if necessary, for loading other assemblies in the other cells, h) removing the pneumatic tool and replacing the plug for the pneumatic tool, i) removing the dynamic confinement means, j) removing the cask.

We shall now describe in detail the method for filling a container according to the present invention.

During step a), the cask is placed on the container by means of angular indexation mechanical means formed by the groove and the rib as described earlier and by the visual marks 54 present on the outer walls of the cask and of the container.

In step b), the suction means 202 is connected to the bottom of the container.

In step c), in order to place the pneumatic tool, the operator brings a suction cup so as to catch the plug 16 of the pneumatic connector. The plug 16 is removed from the passage 14 and deposited in a housing provided on the upper face of the upper bottom 8.

Next, the pneumatic plug of the container is gripped by the gripping means or gripper as described earlier, and then raised relatively to the container.

The pneumatic tool is connected, and the shoes are opened so as to allow placement of the assembly.

The operator then places the peg 114 in the groove of the flange 124 corresponding to the displacement of the arm for removing the pneumatic plug. The peg 126 also penetrates into the corresponding orifice of the flange 122.

The operator then turns the handwheel 68, which causes a determined angular displacement of the first arm 60. The operator then blocks the arm 60 in this position by means of the device 128.

The operator then places the peg in the orifice 106.P of the flange 102 of the device 100 in order to displace the second arm 62, the lower end of the peg 114 also penetrates into the corresponding groove 108.P. and then the operator turns the handwheel 86 causing a determined angular displacement of the arm 62. The housing 94, for the pneumatic plug, is then positioned vertically just underneath the suspended pneumatic plug. The pneumatic plug is then moved down and deposited in the housing 94.

The pneumatic plug will remain stored in the housing 94, during the whole time for filling the cells with the containers.

The operator places the arm 62 and the arm 60 in a parking position as earlier, by placing the pegs in the orifices of the adequate grooves.

During step d), the operator will repeat the previous operations by using the corresponding orifices and grooves for removing the plug from the first cell A1 and depositing it in the housing 76 of the second arm 62 with the help of the gripping means 150.

Advantageously, following step d), provision is made for placing a mouth on the contour of the aperture of the cell in order to facilitate insertion of the assembly.

During step e), the operator brings an assembly by means of a handling bridge, at right angles to the aperture of the cask corresponding to the first cell and to the aperture of the first cell, and then moves the assembly down into the cell until it rests on the bottom of the first cell.

During step f), the operator replaces the plug of the first cell, so as to seal the first cell and to confine the assembly loaded in the cell. For this, he/she will displace in this order, the first, and then the second arm, by placing the pegs in the orifices and grooves corresponding to this operation in order to place the housing 76 above the first cell. By means of the grippers, he/she will catch the plug placed in the housing 76, and raise it relatively to the housing 76 without taking it out of the cask. The operator then displaces the first and second arms for placing them in the rest position.

Next, he/she moves the plug down until it is placed in the upper end of the first cell.

During step g), which only occurs if more than one assembly has to be loaded, the operator executes steps d) to f) for all the cells or a portion of them.

During step h), when the assemblies are in place and the cells are in a sealing state, the shoes are applied against the assemblies in order to immobilize them in the cells.

The operator disconnects the pneumatic tool and replaces the pneumatic plug by displacing the first and second arms, as this was explained earlier.

During step i), the dynamic confinement means are disconnected.

The container is depressurized.

During step j), the cask is lifted from the container and deposited on a receptacle.

The container is then ready to be loaded, for example on a truck, for its transport to a nuclear power station.

Advantageously, a cleaning step, for example by suction, is provided before removing the cask from the container.

With the cask as illustrated, provision is made for disconnecting the pneumatic tool before loading the first chamber A1, and for then replacing the pneumatic tool. Indeed, the illustrated embodiment does not provide the position combinations of both arms for the eight positions without having to remove the pneumatic tool.

The invention claimed is:

1. A cask for loading at least one nuclear fuel assembly in a transport container, including a body with a longitudinal axis configured to cover sealably an upper end of a container, at least one aperture for letting through a fuel assembly, and at least one means configured to maintain a plug for sealing a chamber of the container inside the cask and at a distance from one entrance of said chamber during loading, wherein the maintaining means includes a first arm rotationally mobile around a first axis and a second arm attached to the first arm and rotationally mobile relatively to the first arm, said cask also including external control device for controlling the arms, and wherein the second arm includes a housing for receiving the sealing plug.

2. The cask according to claim 1, including an aperture for letting through a pneumatic tool configured to be connected to the container, and a housing for receiving a plug when the pneumatic tool is connected, said plug configured to seal the aperture for connecting the pneumatic tool to the container.

3. The cask according to claim 1, the control device includes means for controlling the first arm and means for controlling the second arm, the second arm being displaceable independently of the first arm.

4. The cask according to claim 3, wherein the control device is manually actuated and includes assistance means for displacing the arms along predetermined trajectories.

5. The cask according to claim 4, wherein the control device are formed by first and second handwheels firmly attached to first and second connecting shafts, respectively, said first and second connecting shafts being mechanically connected to the first and second arms, respectively.

6. The cask according to claim 5, wherein the assistance means include a fixed flange and a rotationally mobile flange with a connecting arm, the flanges being superimposed, a flange including at least one imprint delimiting two extreme positions of the associated arm and an abutment borne by the other flange, so as to limit the angle of rotation between both flanges.

7. The cask according to claim 6, wherein the mobile flange associated with the second arm is formed by the handwheel.

8. The cask according to claim 6, wherein the mobile flange is distinct from the handwheel for controlling the first arm and jointly rotatable with the latter.

9. The cask according to claim 8, wherein the fixed flange for the first arm is attached onto the upper surface of the cask.

10. The cask according to claim 6, wherein the assistance means include an imprint so as to define two extreme positions adapted to each chamber of the container.

11. The cask according to claim 1, wherein the control device includes indexation means for the position of each arm.

12. The cask according to claim 1, wherein the housing is placed at a free end of the second arm and in that it includes a sealed bottom so as to collect dusts and/or debris borne by the sealing plug.

13. The cask according to claim 1, wherein the arm also includes the housing for the plug of the orifice for pneumatically connecting the container.

14. The cask according to claim 1, wherein the cask includes several apertures each placed opposite to a respective chamber of the container, for loading and unloading nuclear fuel assemblies.

15. The cask according to claim 1, including at its lower end configured to come into contact with the upper end of the container, first and second annular bearing faces, configured to respectively bear against first and a second supporting faces of the container, the second bearing face being positioned radially towards the inside of the cask relatively to the first bearing face, both bearing faces being connected through a cylinder extending along the longitudinal axis.

16. The cask according to claim 1, including a plug for the aperture.

17. The cask according to claim 1, including an aperture sealed by a plug for letting through a pneumatic tool configured to be connected to the container, and a housing for receiving a plug when the pneumatic tool is connected, said plug configured to seal the orifice for connecting the pneumatic tool to the container.

18. A device for loading at least one nuclear fuel assembly in a transport container, including a cask for loading at least one nuclear fuel assembly in a transport container, including a body with a longitudinal axis configured to cover sealably an upper end of a container, at least one aperture for letting through a fuel assembly, and at least one means configured to maintain a plug for sealing a chamber of the container inside the cask and at a distance from one entrance of said chamber during loading, wherein the maintaining means includes a first arm rotationally mobile around a first axis and a second arm attached to the first arm and rotationally mobile relatively to the first arm, said cask also including an external control device for controlling the arms, and wherein the second arm includes a housing for receiving the sealing plug, and dynamic confinement means configured to be connected with a channel communicating with the inside of the chambers and configured to cause a flow of air from the outside to the inside of the cask, and then to the inside of the chambers for the whole opening period of a chamber.

19. The device according to claim 18, wherein the dynamic confinement means include a pneumatic suction exhauster configured to be connected to collector (206) for collecting particles sucked up into the container.

20. A method for loading a container with a nuclear fuel assembly, including the following steps:
   a) placing a cask for loading at least one nuclear fuel assembly in a transport container, including a body with a longitudinal axis configured to cover sealably an upper end of a container, at least one aperture for letting through a fuel assembly, and at least one means configured to maintain a plug for sealing a chamber of the container inside the cask and at a distance from one entrance of said chamber during loading, wherein the maintaining means includes a first arm rotationally mobile around a first axis and a second arm attached to the first arm and rotationally mobile relatively to the first arm, said cask also including an external control device for controlling the arms, and wherein the second arm includes a housing for receiving the sealing plug, on the upper end of a container,
   b) connecting dynamic confinement means in a lower portion of the container in order to create an air flow towards the inside of the container,
   c) removing the plug for the pneumatic tool and placing the pneumatic tool,
   d) removing the plug from the first cell,
   e) placing an assembly in the first cell,
   f) replacing the plug of the first cell,
   g) repeating steps d) to f) if necessary, for loading other assemblies in the other cells,
   h) removing the pneumatic tool and replacing the plug for the pneumatic tool,
   i) disconnecting the dynamic confinement means, and
   j) removing the cask.

21. The method according to claim 20, wherein the dynamic confinement means are actuated prior to the removal of the plug of the first cell.

22. The method according to claim 20, wherein a step for removing a plug from an associated passage of the cask is carried out prior to the removal of the pneumatic plug of the container or of the plugs of the cells.

* * * * *

UNITED STATES PATENT AND TRADEMARK OFFICE
CERTIFICATE OF CORRECTION

PATENT NO. : 8,576,973 B2  Page 1 of 1
APPLICATION NO. : 12/298759
DATED : November 5, 2013
INVENTOR(S) : Serge Fantini It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1410 days.

Signed and Sealed this
Twenty-second Day of September, 2015

Michelle K. Lee
*Director of the United States Patent and Trademark Office*